United States Patent [19]

Liebl et al.

[11] Patent Number: 4,816,542

[45] Date of Patent: Mar. 28, 1989

[54] PROCESS FOR THE PREPARATION OF COATINGS FROM POLYURETHANE SINGLE COMPONENT SYSTEMS AND STEAM

[75] Inventors: Herbert Liebl, Olching/Neu-Esting; Peter Roche, Munich; Matthaeus Rank, Olching/Neu-Esting, all of Fed. Rep. of Germany

[73] Assignee: Elastogran Polyurethane GmbH, Lemförde, Fed. Rep. of Germany

[21] Appl. No.: 193,824

[22] Filed: May 13, 1988

[30] Foreign Application Priority Data

May 16, 1987 [DE] Fed. Rep. of Germany ....... 3716479

[51] Int. Cl.$^4$ .............................................. C08G 18/10
[52] U.S. Cl. .................................... 528/59; 525/452; 525/453; 525/460; 528/76; 528/77; 528/80; 528/81; 528/480; 528/502
[58] Field of Search .................. 528/59, 75, 77, 80, 528/81, 480, 502; 525/452, 453, 460

[56] References Cited

U.S. PATENT DOCUMENTS 4,720,535  1/1988  Schleier et al. ..................... 528/59

Primary Examiner—Maurice J. Welsh
Attorney, Agent, or Firm—Bill C. Panagos

[57] ABSTRACT

The present invention relates to a process for the preparation of coatings by reacting polyurethane single component systems, which preferably contain at least one prepolymer containing NCO groups in bonded form and a latent hardener, whereby the polyurethane single component system is mixed with steam at a temperature from 100° C. to 500° C., and fed under a pressure of 0.5 to 10 bars, and finally sprayed using a general spray method. The coatings so formed cure bubble free independent of the moisture content of the surroundings and without exhibiting coating mass runoff.

8 Claims, No Drawings

PROCESS FOR THE PREPARATION OF COATINGS FROM POLYURETHANE SINGLE COMPONENT SYSTEMS AND STEAM

BACKGROUND OF THE INVENTION

Dual component polyurethane systems are widely used as coatings and in the preparation of elastic floor coverings. Moreover, other processes are known in which the inner surfaces of molds are sprayed with two component polyurethane systems. European Patent Application No. 0 189 845 teaches the preparation of cellular or noncellular plastics, such as coatings, from at least two starting materials which react with one another, such as organic polyisocyanates, higher molecular weight polyhydroxyl compounds and optionally lower molecular weight chain extending agents; whereby the starting materials are fed separately into a mixing zone, then mixed together, subsequently discharged and fed together with air heated to from 100° C. to 120° C. with the component mixture exiting the mixing zone. By way of illustration under these reaction conditions, a reaction mixture for preparing polyurethane coatings can be uniformly prepared and applied in an evenly arranged stream onto a substrate. A rapid increase in viscosity follows the first very slow polyurethane formation in the mixing zone which is accelerated by the heated air. The increase in viscosity is advantageous to the process. Moreover, the flow problems and droplet formation is prevented on vertical surfaces.

When using the two component systems of the prior art, it was necessary to work with expensive, complicated proportioning and mixing equipment, often under difficult conditions. For some time, there has been a need to replace these systems with more easily manageable polyurethane single component systems.

Prepolymers containing NCO groups in bonded form have acquired great importance as polyurethane single component systems. These prepolymers are preferably based on higher molecular weight polyhydroxyl compounds and organic polyisocyanates such as hexamethylene diisocyanates, toluene diisocyanates and diphenylmethane diisocyanates, which, following moisture contact on their upper surface, cure into urea group containing polyurethanes. When employing high moisture concentrations and thick polyurethane coatings, the curing process must be adjusted in order to avoid bubble formation so that any carbon dioxide formed can escape prior to curing.

By adding latent hardeners to the prepolymers containing NCO groups in bonded form, single component polyurethane systems are obtained which cure without the formation of carbon dioxide. The latent hardeners are blocked reaction partners for the organic polyisocyanates which, under the influence of moisture, are converted into reactive compounds. Typical latent hardeners are oxazolidines, enamines and azomethines, such as ketimines and aldimines. Polyurethane single component systems, which contain prepolymers having NCO groups in bonded form and latent hardeners, cure bubble free independent from the moisture content of the surroundings, even under water. Accordingly, the outdoor processing of such polyurethane single component systems is essentially independent of the weather.

The rate of diffusion of water into the curable polyurethane masses is indicative of the cure rate for the polyurethane single component systems. Thus, thicker polyurethane coatings cure more slowly. For this reason, thicker coating layers are difficult to apply on vertical surfaces because of coating mass run off.

SUMMARY OF THE INVENTION

The present invention is a process for the preparation of single component polyurethane coating systems. The systems preferably contain at least one prepolymer containing NCO groups in bonded form and a latent hardener, whereby the polyurethane single component system is mixed with steam at a temperature of 100° C. to 500° C. and fed under a pressure of from about 0.5 to 10 bar through a spray nozzle. It is sprayed onto a substrate using any generally known spraying method.

The coating so formed does not suffer run-off or bubble and droplet formation problems endemic in the prior art.

The object of the present invention is to quickly and reliably prepare polyurethane single component systems as coatings, which may be processed having layer thicknesses of 5 mm and more, without having the polyurethane mass run off of vertical surfaces, rear sections or sharp corners before curing or without having the polyurethane mass form undesirable droplets.

This object was surprisingly met by using steam as a reactant and by using pressurized gas for spraying the polyurethane single component system.

DETAILED DESCRIPTION OF THE PREFERRED EMBODIMENT

The present invention relates to a process for the preparation of coatings by reacting polyurethane single component systems and water wherein at least one polyurethane single component system is mixed with steam and sprayed.

The steam is normally fed under a pressure of from 0.5 bar to 10 bars, more preferably from 2 to 5 bars, and most preferably from 2.5 to 3.2 bars, and has a temperature from 100° C. to 500° C., more preferably 100° C. to 250° C. and most preferably 120° C. to 150° C.

It is most preferred to use steam having a temperature of from 100° C. to 250° C. which is fed under a pressure of 2.0 to 5.0 bars into the injecting unit for such as a spray pistol.

Basically there are two processes available for spraying the polyurethane single component systems.

Following a modified "Airless" process, the polyurethane single component system as well as any optional catalysts, auxiliaries and/or additives, and the steam, is mixed in a high pressure process in the counter stream or by means of a static mixer and then sprayed under high pressure through nozzles.

With the so-called air injection, the polyurethane single component system as well as any optional catalysts, auxiliaries and/or additives is mixed in a low pressure process in a static mixing tube or by mixing with a mechanical stirrer in a mixing chamber. Following discharge from the nozzle, the component mixture according to this process is treated with steam and in turn is atomized.

In the most preferred method for preparing coatings according to the present invention, a spray unit of the type of commercial pressurized air spray pistols is used, provided that the required air pressure is replaced by steam when operated. It has been proven to be particularly advantageous if the spray pistol is constructed so that a steam bell is created by arrangement of a concentric annular passage around the injection nozzle which externally shuts off the spray stream. By this measure, the spray stream is finely divided and fogging of the surrounding area is substantially reduced. In addition, the heat conduction with steam immediately initiates the addition polymerization reaction, and possibly as well, the flashing off of an optionally used solvent and diluent. The quick reaction and viscosity increase insures that the sprayed polyurethane single component system is already reacting when it comes into contact with the surface being sprayed. Moreover, one achieves the formation of thicker layers, for example from 0.03 to 5 mm, and more using this process. Furthermore, the polyurethane mass no longer runs off and other unopportunistic signs, such as droplet formation, do not occur.

Preferably, the spray surface is distanced from the application a distance of from about 0.1 to 1.2 m, more preferably 0.3 to 0.5 m and is sprayed employing a spray angle of about 10° to 90° and more preferably from about 60° to 90°. The discharge rate of the polyurethane single component system depends on the type of spray unit used and normally is from about 50 to 2000 g/minute and more preferably about 150 to 1000 g/minute. In addition, for every 1 kg of polyurethane single component system, on the average, from about 0.01 to 1.0 kg or more preferably from 0.05 to 0.4 kg of steam is required.

The polyurethane single component system for forming the coatings is comprised of conventional polyurethane prepolymers having NCO contents from about 1 to 20 weight percent, more preferably from about 1 to 10 weight percent and most preferably from about 2.5 to 6 weight percent. The products are prepared by reacting excess quantities of organic polyisocyanates, preferably aliphatic, cycloaliphatic and most preferably aromatic diisocyanates, with higher molecular weight polyols or mixtures of higher molecular weight polyols and lower molecular weight chain-extending agents and/or crosslinking agents. The isocyanate group containing prepolymers are preferably free of monomeric polyisocyanates. However, polyurethane prepolymers which possibly contain secondary quantities of monomeric organic polyisocyanates, for example from 0 to 5 weight percent, more preferably from 0 to 2 weight percent, may also be used.

The preferred polyurethane single component systems are formulations which, along with the aforesaid polyurethane prepolymers, contain, in addition, a latent hardener preferably selected from the group consisting of: oxazolidines, enamines and azomethines, more preferably ketimines and/or most preferably aldimines as well as optional organic carboxylic acids such as, for example, aromatic and/or aliphatic carboxylic acids or arylsulfonic acids as catalysts and optionally auxiliaries and/or additives.

The most preferred polyurethane single component systems are comprised of polyurethane prepolymers having an NCO content from about 1 to 10 weight percent and which are prepared by reacting organic, preferably aliphatic, cycloaliphatic, and/or aromatic polyisocyanates, and higher molecular weight polyols, preferably di- and/or trifunctional polyester polyols and/or polyether polyols having molecular weights from 500 to 8000 which contain at least one ketimine and/or preferably an aldimine as a latent hardener in such a quantity so that from about 0.2 to 1.3, more preferably from about 0.5 to 0.9 equivalents of —N=C< and/or —N=CH— groups are present per NCO group of the polyurethane prepolymer.

The following are typical examples of starting components for the preparation of the polyurethane single component systems:

Preferably aliphatic, cycloaliphatic and/or most preferably aromatic diisocyanates are used as organic polyisocyantes. Individual examples are: aliphatic diisocyanates such as ethylene diisocyanate, 1,4-tetramethylene diisocyanate, 1,6-hexamethylene diisocyanate, and 1,12-dodecane diisocyanate, cycloaliphatic diisocyanates, such as 1,3-cyclohexane diisocyanate and 1,4-cyclohexane diisocyanate as well as optional mixtures of the isomers, 1-isocyanato-3,3,5-trimethyl-5-isocyanatomethyl-cyclohexane, (IPDI) 2,4 and 2,6-hexahydrotoluene diisocyanate as well as optional mixtures of the isomers 4,4'- and 2,4' diisocyanato-dicyclohexylmethane and aromatic diisocyanates such as 1,5-diisocyanato-naphthalene, diisocyanato-benzole, 2,4- and 2,6-diisocyanato-toluene and the corresponding isomeric mixtures 4,4'-, 2,4'- and 2,2'-diphenylmethane diisocyanate and the corresponding isomeric mixtures, polyphenyl polymethylene polyisocyanate, mixtures of diphenylmethane diisocyanates and polyphenyl polymethylene polyisocyanates and/or diisocyanato toluene isomers. Said di- and polyisocyanates can be used individually or in the form of mixtures. It is preferred to use PIDI, 4,4'-diisocyanato-dicyclohexylmethane, 1,6-hexamethylene diisocyanate, 2,4'- and/or 4,4'-diphenylmethane-diisocyanate or mixtures of 2,4'- and/or 4,4'-diphenylmethane-diisocyanate and from about 0 to 30 weight percent, more preferably from about 0 to 10 weight percent of polyphenyl polymethylene polyisocyanates whereby the weight percents are based on the total weight of the mixture.

The polyols which are the reactants for the organic polyisocyanates in the preparation of polyurethane prepolymers normally have a functionality of from about 2 to 3, more preferably of about 2, and have a molecular weight from about 500 to 8000, more preferably from about 1000 to 6000. Suitable polyols may be selected from the group consisting of polyether polyols, polyester polyols, polythioether polyols, polyester amides, hydroxyl group containing polyacetals, hydroxyl group containing aliphatic polycarbonates and hydroxyl group containing polybutadiene telemers or mixtures of at least two said polyols. Preferably, polyester polyols and/or polyether polyols are used.

Typical polyester polyols can be prepared from organic dicarboxylic acids having from 2 to 12 carbon atoms, preferably aliphatic dicarboxylic acids having from 4 to 6 carbon atoms and multivalent alcohols, preferably diols, and from 2 to 12 carbon atoms, more preferably from 2 to 6 carbon atoms. Typical dicarboxylic acids are: succinic acid, glutaric acid, adipic acid, suberic acid, azelaic acid, sebacic acid, dodecanic carboxylic acid, maleic acid, and fumaric acid. The dicarboxylic acids can be used individually as well as mixtures with one another. In place of the free dicarboxylic acids, the corresponding dicarboxylic acid derivatives can be used such as dicarboxylic acid esters of alcohols having from 1 to 4 carbon atoms or dicarboxylic acid anhydrides. Preferably dicarboxylic acid mixtures may be used selected from glutaric, succinic and adipic acid in quantity ratios of for example 20–35:35–50:20–32 parts by weight. Most preferably, adipic acid is used. Examples of multivalent alcohols, and particularly diols are: ethanediol, diethylene glycol, 1,2- and 1,3- propanediol, dipropylene glycol, 1,4-butanediol, 1,5-pentanediol, 1,6-hexanediol, 1,10-decandiol, glycerine and trimethylolpropane. Preferably ethanediol, diethylene glycol, 1,4-butanediol, 1,5-pentanediol, 1,6-hexanediol, and polyoxytetramethylene glycols having molecular weights from 300 to 800 or mixtures of at least two of the aforesaid diols are used. Most preferably, mixtures of 1,4-butanediol, 1,5-pentanediol and 1,6-hexanediol. In addition polyester polyols from lactones for example ξ-caprolactone or hydroxycarboxylic acids such as ω-hydroxycarboxylic acids can be used. Polyoxytetramethylene glycol polyadipates have proven to be most preferred in the preparation of elastic polyurethane coatings having particularly high strength values.

The polyester polyols preferably have a functionality of 2 and have a molecular weight from about 500 to 3000 and more preferably from about 1000 to 2500.

However, the most preferred polyols are polyether polyols which are prepared according to conventional processes such as by the anionic polymerization with alkali hydroxides such as sodium or potassium hydroxides or alkali alkoholates such as sodium methylate, sodium or potassium ethylate or potassium isopropylate as catalysts, or by cationic polymerization with Lewis acids such as antimony pentachloride, boron fluoride etherate, etc., or with bleaching earth as a catalyst from one or more alkylene oxides having from 2 to 4 carbon atoms in the alkylene radical, and optionally with an initiator molecule which contains in bonded form from 2 to 3 and more preferably 2 reactive hydrogen atoms.

Typical alkylene oxides may be selected from tetrahydrofuran, 1,3-propylene oxide, 1,2- and/or 2,3-butylene oxide, styrene oxide, epichlorhydrine and preferably ethylene oxide and 1,2-propylene oxide. The alkylene oxides can be used individually, alternating one after another or as mixtures. Typical initiator molecules are: water, organic dicarboxylic acids such as succinic acid, adipic acid, phthalic acid and terephthalic acid, alkanolamines, such as ethanolamine, diethanolamine and triethanolamine and ammonia. It is preferred to use di- and/or trivalent alcohols such as ethanediol, 1,2-propanediol and 1,3-propanediol, diethylene glycol, dipropylene glycol, 1,4-butanediol, 1,6-hexanediol, glycerin and trimethylolpropane.

The polyether polyols preferably have a functionality of 2 and have molecular weights from about 500 to 8000, more preferably from about 1000 to 6000, and most preferably from about 1800 to 4000. As with polyester polyols, they can be used as mixtures or individually. Moreover, they can be mixed with polyester polyols as well as with the hydroxyl group containing polyester amides, polyacetals and/or polycarbonates.

Typical hydroxyl group containing polyacetals are those prepared from glycols such as diethylene glycol, triethylene glycol, 4,4'-dihydroxyethoxy-diphenyl-dimethylmethane, hexanediol and formaldehyde. Suitable polyacetals can also be prepared by the polymerization of cyclic acetales.

Typical hydroxyl group containing polycarbonates are ordinary ones which can be prepared by reacting diols such as 1,3-propanediol, 1,4-butanediol and/or 1,6-hexanediol, diethylene glycol triethylene glycol or tetraethylene glycol, with diarylcarbonates such diphenylcarbonate or phosgene.

Among the polyester amides are those derived from multivalent saturated and/or unsaturated carboxylic acids and/or their anhydrides, and multivalent saturated and/or unsaturated amino alcohols or mixtures of multivalent alcohols and amino alcohols and/or polyamines, preferably linear condensates.

To modify the mechanical properties of the coatings, the polyurethane prepolymers may optionally be made using lower molecular weight chain extending agents and/or cross-linking agents in an amount of from about 0 to 100 and more preferably from about 0 to 50 hydroxy equivalent percents based on the total amount of polyols. Such typical agents are polyfunctional, most preferably di- and/or trifunctional compounds, having molecular weights from about 62 to 500, more preferably from about about 62 to about 300. It is preferred to use aliphatic diols and/or triols having from 2 to 6 carbon atoms such as ethanediol, 1,4-butanediol, 1,6-hexanediol, glycerin and trimethylolpropane.

When preparing the polyurethane prepolymers, the polyol or the polyol mixture, which is preferably the di- and/or trifunctional polyester polyols and/or polyether polyols having molecular weights from 500 to 8000, is reacted with excess organic polyisocyanate or a polyisocyanate mixture in a conventional fashion in such quantity ratios so that the resulting polyurethane prepolymer possess the previously stated NCO contents. Preferably, the preparation of polyurethane prepolymers is conducted in the absence of lower molecular weight chain extending agents or cross-linking agents.

Malonic acid diethylester can be incorporated into the polyurethane prepolymers and/or into the polyurethane single component systems as an additive for decreasing the viscosity increase. Malonic acid diethylester is present in an amount from about 0 to 10 weight percent, more preferably from about 1 to 4 weight percent based on the weight of the polyurethane prepolymer.

When preparing coatings according to the process of the present invention, the polyurethane single component systems are preferably mixed with steam and sprayed onto a substrate. Moreover, in addition to comprising a prepolymer or prepolymer mixture containing NCO groups, the system comprises at least one latent hardener selected from the group consisting of: oxazolidine, enamine and azomethines; more preferably ketimines and/or most preferably aldimines. Latent hardeners of these types are well known and are disclosed for example in the following references:

U.S. Pat. No. 3,743,626, Federal Republic of Germany Pat. No. 24 46 438 (U.S. Pat. No. 4,002,601), Federal Republic of Germany Pat. No. 26 32 513 (U.S. Pat. No. 4,118,376), Federal Republic of Germany Pat. No. 25 21 841 (U.S. Pat. No. 4,059,549), Federal Republic of Germany Pat. No. 17 19 121 (U.S. Pat. No. 3,715,338), Federal Republic of Germany Pat. No. 21 25 247 (U.S. Pat. No. 3,865,791 and U.S. Pat. No. 3,941,753) Federal Republic of Germany Application No. 31 33 769, Federal Republic of Germany Application No. 33 06 373, Federal Republic of Germany Application No. 36 07 996 and Federal Republic of Germany Application No. 36 24 924.

The latent hardeners hydrolyze in the presence of moisture. The hydrolysis rate can be accelerated by adding organic carboxylic acids such as aliphatic and preferably aromatic carboxylic acids or arylsulfonic acid as catalysts. Typical examples are aliphatic carboxylic acids such as fumaric acid, acetic acid, mono-, di- and trichloroacetic acid, oxalic acid, malonic acid, maleic acid and fumaric acid; aromatic carboxylic acids such as benzoic acid, mono-, di- and trichlorobenzoic acid, salicylic acid and alkylmonophthalate and arylsulfonic acids, such as for example xylene sulfonc acid and preferably toluene sulfonic acid or their mixtures.

Preferably used are benzoic acid and mixtures of toluene and toluene sulfonic acid. If organic carboxylic acids or arylsulfonic acids are incorporated into the polyurethane single component system containing a latent hardener, from about 0 to 20 meq, more preferably from about 1 to 5 meq, is used per equivalent of —N═CH— and —N═C<.

EXAMPLE 1

A Polyurethane Single Component System was formed of a mixture of
(a) 100 parts by weight of a prepolymer having an NCO content of 3 weight percent, prepared by reacting a polyoxypropylene-polyoxyethylene polyol having an average functionality of 2.3 and having a hydroxyl number of 30 with 2,4'-diphenylmethane diisocyanate,
(b) 12.0 parts by weight of a dialdimine, prepared by reacting 1,6-hexamethylene diamine and isobutyraldehyde,
(c) 6 parts by weight of a 10 weight percent solution of benzoic acid in ethylacetate, and
(d) 3 parts by weight of xylene.

The resulting mixture had a viscosity of 400 mPas at 25° C.

Steam was fed into a hot steam-spray pistol at a temperature of 120° C. and under a pressure of 3.8 bar. It was mixed with the above described polyurethane single component system, and without interruption it was sprayed onto a vertically positioned surface.

The steam consumption was 350 liters/minute, the discharge rate was at about 500 g/minute and the throughput temperature of the coating mixture out of the nozzle was 120° C.

Immediately a tack free coating formed which exhibited no run-off even with a layer thickness of 200 μm. The coating had the following mechanical properties:
Tensile Strength according to DIN 53 504 S1: 4.4 N/mm$^2$
Elongation at Break according to DIN 53 540 S1: 480%
Shore A Hardness according to DIN 53 505: 70

COMPARATIVE EXAMPLE

The polyurethane single component system described in Example 1 was diluted with xylene to a viscosity of 150 mPas at 25° C. and then, using an air pressurized spray pistol, it was sprayed onto a vertically positioned surface.

The system was applied in three spraying steps employing intermediate venting and a coating formed having a maximum layer thickness of 45 μm.

The coating remained tacky for about 1 hour and thereafter finally cured from the surface outward in about 6 hours.

After two days of aging the following mechanical properties were measured on the cured coating:
Tensile Strength according to DIN 53 504 S1:4.6 N/mm$^2$
Elongation at Break according to DIN 53 540 S1:420%
Shore A Hardness according to DIN 53 505: 75

The embodiments of the invention in which an exclusive privilege or property is claimed are defined as follows:

1. A process for preparing coatings comprising spraying, under pressure and with steam, a single component polyurethane system comprising a prepolymer having an NCO content in bonded form of from about 1 to 20 weight percent, and a latent hardener.

2. The process according to claim 1, wherein the steam is fed under a pressure of about 0.5 to 10 bars.

3. The process according to claim 1, wherein the steam has a temperature from about 100° to 500° C.

4. The process according to claim 1, wherein the steam has a temperature from 100° to 250° C. and it is fed under a pressure of about 2.0 to 5.0 bars.

5. The process according to claim 1, wherein from about 0.01 to 1.0 kg of steam is required per kg of the polyurethane single component system.

6. The process according to claim 1, wherein the polyurethane single component systems comprise prepolymers containing NCO groups in bonded form having an NCO content from 1 to 10 weight percent and which are prepared by reactions of
(a) organic polyisocyanates selected from the group consisting of aliphatic, cycloaliphatic, aromatic polyisocyanates and mixtures thereof with
(b) higher molecular polyols, selected from the group consisting of difunctional polyester or polyether polyols having a molecular weight of from about 500 to 8000, trifunctional polyester polyether polyols having molecular weights from about 500 to 8,000, and mixtures thereof.

7. The process according to claim 1, wherein the polyurethane single component systems comprise: a polyurethane prepolymer having an NCO content from about 1 to 10 weight percent, prepared by the reaction of organic polyisocyanates and higher molecular polyols, and a latent hardener selected from the group consisting of an aldemine, a ketimine and mixtures thereof.

8. The process according to claim 1, wherein the polyurethane single component systems comprise: a polyurethane prepolymer having an NCO content from about 1 to 10 weight percent and a ketimine and/or aldimine as a latent hardener in such a quantity so that from about 0.2 to 1.3 equivalents of —N═C< and/or —N═CH— groups are present per NCO group of the urethane prepolymer.

* * * * *